US012166909B2

(12) United States Patent
Sohanghpurwala et al.

(10) Patent No.: US 12,166,909 B2
(45) Date of Patent: Dec. 10, 2024

(54) COMPUTER TECHNOLOGY TO ENSURE AN ELECTRONIC DESIGN AUTOMATION (EDA) IMPLEMENTATION FOR ELECTRONIC CIRCUITRY IS TRACEABLE, AUDITABLE, AND REPRODUCIBLE

(71) Applicant: Graf Research Corporation, Blacksburg, VA (US)

(72) Inventors: Ali Asgar Sohanghpurwala, Decatur, GA (US); Scott Harper, Blacksburg, VA (US); Jonathan Graf, Blacksburg, VA (US); Carlton Fraley, Christiansburg, VA (US); Alan Cook, Christiansburg, VA (US); Timothy Dunham, Roanoke, VA (US)

(73) Assignee: Graf Research Corporation, Blacksburg, VA (US)

( * ) Notice: Subject to any disclaimer, the term of this patent is extended or adjusted under 35 U.S.C. 154(b) by 257 days.

(21) Appl. No.: 17/950,341

(22) Filed: Sep. 22, 2022

(65) Prior Publication Data
US 2023/0087217 A1 Mar. 23, 2023

Related U.S. Application Data

(60) Provisional application No. 63/246,886, filed on Sep. 22, 2021.

(51) Int. Cl.
*H04L 9/00* (2022.01)
*G06F 30/31* (2020.01)
*H04L 9/32* (2006.01)

(52) U.S. Cl.
CPC ............... *H04L 9/50* (2022.05); *G06F 30/31* (2020.01); *H04L 9/3247* (2013.01)

(58) Field of Classification Search
None
See application file for complete search history.

(56) References Cited

U.S. PATENT DOCUMENTS

| 7,509,618 | B1 * | 3/2009 | Hutton | G06F 30/331 |
| | | | | 716/104 |
| 9,659,142 | B1 * | 5/2017 | Coelho, Jr. | G06F 30/33 |

(Continued)

OTHER PUBLICATIONS

"Advanced Persistent Threats (APTs)" FireEye. [Online], https://www.fireeye.com/current-threat/apt-groups.html, accessed: Jun. 8, 2021, 22 pages.

(Continued)

*Primary Examiner* — Chris Parry
*Assistant Examiner* — Abderrahmen Chouat
(74) *Attorney, Agent, or Firm* — NIXON & VANDERHYE P.C.

(57) ABSTRACT

A computer system traces an original electronic design automation (EDA) implementation process for electronic hardware designs. The original EDA implementation process includes multiple subprocesses to convert a hardware model to a physically-realized electronic circuit. The system inputs a cryptographic key and design information that includes the hardware model, constraints, properties, implementation settings, and other directives for directing the conversion. The cryptographic key and design information are processed to generate a sequence of instructions to execute and provide traceability of each subprocess. For each subprocess, the system gathers intermediate design state and implementation settings resulting from or influencing execution of the subprocess; combines the intermediate design state and implementation settings into a data string and determines a cryptographic hash value for the data string; digitally signs the cryptographic hash value using a digital signature certificate derived from the cryptographic (Continued)

key to generate a signed hash; stores the signed hash and identifiers associated with data files used for determining the cryptographic hash value to an electronic ledger to generate an updated electronic ledger; authenticates the signed hash from the electronic ledger to generate an authenticated signed hash; reconstructs a hash from the data files stored in the electronic ledger to generate a reconstructed hash; compares the authenticated signed hash with the reconstructed hash, and in response to a mismatch, generates an error signal. The steps are repeated for each subsequent subprocess, and the traced EDA implementation process results are stored in memory.

20 Claims, 10 Drawing Sheets

(56) References Cited

U.S. PATENT DOCUMENTS

| | | | | |
|---|---|---|---|---|
| 10,853,536 | B1* | 12/2020 | Steingrimsson | G06F 30/20 |
| 10,902,132 | B2 | 1/2021 | Graf et al. | |
| 11,531,773 | B2 | 12/2022 | Graf et al. | |
| 11,574,111 | B1* | 2/2023 | Sengupta | G06F 30/392 |
| 2013/0145329 | A1* | 6/2013 | Brandt | G06F 30/327 |
| | | | | 716/104 |
| 2013/0305202 | A1* | 11/2013 | Shroff | G06F 30/39 |
| | | | | 716/112 |
| 2014/0068246 | A1* | 3/2014 | Hartley | H04L 9/0866 |
| | | | | 713/176 |
| 2016/0125111 | A1* | 5/2016 | Yu | G06F 30/3323 |
| | | | | 716/106 |
| 2020/0356085 | A1* | 11/2020 | Wentz | H04L 9/0866 |
| 2022/0108056 | A1* | 4/2022 | Biswas | G06F 30/323 |
| 2023/0048589 | A1* | 2/2023 | Shannon | G06F 21/53 |

OTHER PUBLICATIONS

Y. Shoshitaishvili et al, "(State of) The Art of Ware: Offensive Techniques in Binary Analysis" 2016 IEEE Symposium on Security and Privacy (SP), May 22-26, 2016, 20 Pages.

"Functional correctness of FPGA synthesis from RTL code to final netlist," 360 EC-FPGA—OneSpin Solutions. https://www.onespin.com/products/360-ec-fpga, accessed: Jun. 11, 2021, 5 pages.

P.S. Vadgaonkar et al, "DO-254/ED-80—An Application Guidelines to Redesign/Re-Engineering Airborne Electronic Hardware" SAE Technical Paper 2016-01-2039, Sep. 20, 2016, 10 pages.

"ReqTracer," Requirements tracing and management tool—Third-Party Products & Services—MATLAB & Simulink, https://www.mathworks.com/products/connections/product_detail/reqtracer.html, accessed: Jun. 12, 2021, 2 pages.

"Spec-TRACER—Requirements Management—Products—Aldec," The Design Verification Company—Aldec, Inc., https://www.aldec.com/en/products/requirements_management/spec-tracer, accessed: Jun. 12, 2021, 3 Pages.

S. Nakamoto, "A peer-to-peer electronic cash system" Manubot, 2019, pp. 1-9.

A. Sohanghpurwala et al, "IP Integrity Flow: Ensuring IP Integrity in FPGA Synthesis," GOMACTech 2021, 6 pages.

"Vivado Design Suite" Xilinx, https://www.xilinx.com/products/design-tools-vivado.html, accessed: Jun. 8, 2021, 11 pages.

Xilinx, Inc., "XAPP1335: Isolation Design Flow for UltraScale+ FPGAs and Zynq UltraScale+ MPSoCs," Xilinx, Inc., https://www.xilinx.com/support/documentation/application_notes/xapp1335-isolation-design-flow-mpsoe.pdf, Mar. 9, 2021, 83 pages.

Microsemi, "Specify and Program Security Settings and Keys with SmartFusion2 and IGL002 FPGAs" Implementation Guide, Nov. 2013, 20 pages.

Xilinx, "Using Encryption and Authentication to Secure an UltraScale/UltraScale+ FPGA Bitstream" Mar. 16, 2022, 27 pages.

* cited by examiner

COMPUTER TECHNOLOGY TO ENSURE AN ELECTRONIC DESIGN AUTOMATION (EDA) IMPLEMENTATION FOR ELECTRONIC CIRCUITRY IS TRACEABLE, AUDITABLE, AND REPRODUCIBLE

CROSS REFERENCE(S) TO RELATED APPLICATION(S)

This application claims priority to U.S. provisional application 63/246,886, filed on Sep. 22, 2021, the contents of which are incorporated herein by reference.

STATEMENT REGARDING FEDERALLY SPONSORED RESEARCH OR DEVELOPMENT

This invention was made, in part, with Government support under contracts H98230-20-C-0049 and H98230-21-C-0248. The Government has certain rights in the invention.

The technology in this patent application describes a computer system that aids in verification and trust assessment of microelectronics hardware design implementations by ensuring that an Electronic Design Automation (EDA) implementation process (described below) that converts a high-level model or description of a hardware design to a physically realized functional implementation of corresponding circuitry is traceable, auditable, and reproducible.

An example EDA implementation is a semiconductor intellectual property (IP) core or IP block. An IP core is a reusable unit of logic, cell, or integrated circuit layout design that is typically the intellectual property of one party, which can be licensed to another party or owned and used by a single party. In one example application, designers of application-specific integrated circuits (ASIC) and systems of field-programmable gate array (FPGA) logic can use IP cores as building blocks. Using an IP core or block in integrated circuit (IC) or chip design is comparable to using a library for computer programming or a discrete integrated circuit component for printed circuit board design. Each core or block is a reusable component of design logic with a defined interface and behavior for integration into a larger design.

IP cores are commonly offered as synthesizable register transfer language (RTL) in a hardware description language (HDL) such as Verilog or Very High-Speed Integrated Circuit (VHSIC) Hardware Description Language (VHDL). Hardware description languages are specialized computer languages used to describe the structure and behavior of electronic circuits, and most commonly, digital logic circuits. A hardware description language enables a precise, formal description of an electronic circuit that allows for the automated analysis and simulation of an electronic circuit. It also allows for the synthesis of an HDL description into a netlist (a specification of electronic components and how they are connected together), which can then be placed and routed to produce the set of masks used to create an integrated circuit. These languages are analogous to high level computer programming languages such as C. IP cores delivered to chip designers as RTL permit chip designers to modify designs at a functional level.

IP cores are also sometimes offered as generic gate-level netlists. In this context, the IP core netlist is a representation of the core's logical function implemented as generic gates or process-specific standard cells and the connectivity between these elements. An IP core implemented as generic gates can be compiled for any process technology. A netlist is analogous to an assembly code listing in computer programming. A netlist provides an IP core vendor with some protection against reverse engineering. Both netlist and synthesizable cores are sometimes called "soft cores" since both allow synthesis, placement, and routing (SPR) design flow.

Another example EDA implementation is a collection of IP cores or other logic that is combined to perform some greater function. Like IP cores, this type of hardware design implementation can be in the form of synthesizable RTL in a HDL such as Verilog or VHDL or take the form of gate-level netlists.

In addition to synthesizable RTL and gate-level netlists, an EDA implementation may also take the form of a binary GDSII database file. GDSII files contain planar geometric shapes, labels, and other layout information corresponding to the hardware design in a hierarchical form. GDSII files are used to create photo masks of the hardware design for a targeted process technology during the manufacturing of integrated circuits. GDSII files are analogous to compiled software executables that implement computer programs for a targeted processor architecture.

There are multiple technical challenges with comprehensive EDA implementation verification and design security. For example, it is difficult to examine and verify an implementation of an IP core, and it is also an expensive and time-consuming manual process with significant potential for error. A vulnerability and attack "surface" during the EDA design and implementation process is larger and complex. The proliferation of Advanced Persistent Threat (APT) Groups, often with nation-state level resources poses a problem for the development of trusted microelectronic hardware designs. See for example "Advanced Persistent Threat Groups (APT Groups)," FireEye. [Online]. Available: https://www.fireeye.com/current-threats/apt-groups.html. An undetected malicious actor on an organization network with access to compromised development machines and/or shared filesystems could compromise the integrity of a hardware, software, or firmware design at any stage of the design and implementation process.

Techniques that help verify that an implemented hardware design performs the expected function without any malicious or undesired functionality are computationally expensive and can only verify a specific hardware design representation at a specific point in time. An attacker can bypass these techniques simply by modifying the hardware design after the point at which it was verified. Another challenge is that EDA implementation processes are not necessarily designed to be reproducible as they sometimes rely on stochastic behavior with Pseudo-Random Number Generators (PRNGs) seeded with random values. A solution that addresses certain attack vectors with reproducible builds needs to capture and be able to re-seed the PRNG on the next implementation attempt.

Accordingly, it will be appreciated that new and improved techniques, systems, and processes are continually sought after in these and other areas of technology to address these technical challenges.

Example embodiments of the design verification technology in this application include a computer system for tracing an original electronic design automation (EDA) implementation process for electronic hardware designs, where the original EDA implementation process includes multiple subprocesses to convert a hardware model to a physically-realized electronic circuit, the computer system comprising at least one computer including at least one hardware processor; and storage to store instructions executable in the at least one computer that, when executed by the at least one hardware processor, cause a trace processing module implemented by the at least one computer to: input a cryptographic key and design information that includes the hardware model and one or more of: constraints, properties, implementation settings, and other directives for directing conversion of the hardware model into a physically realized circuit; process the input cryptographic key and design information and generate a sequence of instructions that direct the trace processing module to execute the subprocesses of the EDA implementation process and provide traceability of each subprocess of the EDA implementation process. For each subprocess of the EDA implementation process, the trace processing module is configured perform the following steps:

- a—gather intermediate design state and implementation settings resulting from or influencing execution of the subprocess;
- b—combine the intermediate design state and implementation settings into a data string and determine a cryptographic hash value for the data string;
- c—digitally sign the cryptographic hash value using a digital signature certificate derived from a cryptographic key to generate a signed hash;
- d—store the signed hash and identifiers associated with data files used for determining the cryptographic hash value to an electronic ledger to generate an updated electronic ledger;
- e—authenticate the signed hash from the electronic ledger to generate an authenticated signed hash;
- f—reconstruct a hash from the data files stored in the electronic ledger to generate a reconstructed hash;
- g—compare the authenticated signed hash with the reconstructed hash, and in response to a mismatch, generate an error signal.

The trace processing module is configured to repeat the steps a-g for each subsequent subprocess of the EDA implementation process and store traced EDA implementation process results in memory.

Additional aspects in example embodiments may include, in response to steps a-g being completed for a last subprocess of the EDA implementation process, the trace processing module storing the updated electronic ledger and data used to calculate the hash values for all the subprocesses for the EDA implementation process in a trace archive file. the trace archive file includes information for detection of tampering in one or more of: any of the subprocesses of the EDA implementation process, the implementation settings for each of the subprocesses of the EDA implementation process, and inputs and outputs for each of the subprocesses of the EDA implementation process. The implementation settings in step a may include one or more of: global properties and settings associated with the EDA implementation process and local properties and settings associated with the subprocess. The trace processing module may record results from steps 1-g for each subprocess in a blockchain in the updated electronic ledger.

Additional aspects in example embodiments may include a retrace auditor processing module configured to access the trace results and perform an audit of each of the subprocesses stored in the electronic ledger for the traced EDA implementation process. The retrace auditor processing module, for each subprocess of the traced EDA implementation process, is configured to separately repeat the steps a-g first performed and repeated by the trace processing module. When the signed hash from the electronic ledger is successfully authenticated and matches the reconstructed hash after separately repeating the steps a-g for each subprocess, the retrace auditor processing module is configured to generate a signal indicating that the integrity of the subprocess was not tampered with. When the signed hash from the electronic ledger is not successfully authenticated or does not match the reconstructed hash after separately repeating the steps a-g for each subprocess, the retrace auditor processing module is configured to generate an error signal indicating that the integrity of the subprocess was tampered with. The retrace auditor processing module is configured to verify that required properties or implementation settings were applied during the original EDA implementation process.

Additional aspects in example embodiments may include a retrace rebuild processing module to retrieve the traced EDA implementation process results stored in memory and attempt to recreate the original EDA implementation process and verify that a final physically realized circuit is identical to that of the original EDA implementation process. The retrace rebuild processing module is configured to generate a sequence of instructions that direct the computer system to reproduce the subprocesses of the EDA implementation process necessary to realize the circuit. As each subprocess is processed, the retrace rebuild processing module is configured to apply properties and settings captured by the trace processing module to ensure identical execution of the subprocess. Reproducing the subprocesses of the EDA implementation process may include processing vendor specific information regarding vendor specific execution of subprocesses and customizations and applying the vendor specific information reproduce the subprocesses of the EDA implementation process necessary to realize the circuit. The traced EDA implementation process results in memory include a traced, final physically realized circuit, and wherein the retrace rebuild processing module is configured to compare the final physically realized circuit to the traced, final physically realized circuit to determine whether a match occurs.

Additional aspects in example embodiments may include the retrace rebuild processing module being configured to process data files from an independent repository or computing system that includes independent copies of desired hardware model and properties and settings for execution of the EDA implementation process to generate an independently generated, final physically realized circuit. The trace rebuild processing module may also be configured to compare the final physically realized circuit to the independently generated, final physically realized circuit to determine whether a match occurs.

Other example embodiments include a method for tracing an original electronic design automation (EDA) implementation process for electronic hardware designs, where the original EDA implementation process includes multiple subprocesses to convert a hardware model to a physically-realized electronic circuit. The method includes a processing system with at least one processor performing the following steps:

inputting a cryptographic key and design information that includes the hardware model and one or more of: constraints, properties, implementation settings, and other directives for directing conversion of the hardware model into the physically-realized circuit;

processing the cryptographic key and design information to generate a sequence of instructions that direct the trace processing module to execute the subprocesses of the EDA implementation process and provide traceability of each subprocess of the EDA implementation process;

for each subprocess of the EDA implementation process, the processing system performing the following steps:
   a—gathering intermediate design state and implementation settings resulting from or influencing execution of the subprocess;
   b—combining the intermediate design state and implementation settings into a data string and determine a cryptographic hash value for the data string;
   c—digitally signing the cryptographic hash value using a digital signature certificate derived from a cryptographic key to generate a signed hash;
   d—storing the signed hash and identifiers associated with data files used for determining the cryptographic hash value to an electronic ledger to generate an updated electronic ledger;
   e—authenticating the signed hash from the electronic ledger to generate an authenticated signed hash;
   f—reconstructing a hash from the data files stored in the electronic ledger to generate a reconstructed hash; and
   g—comparing the authenticated signed hash with the reconstructed hash, and in response to a mismatch, generate an error signal; and repeating the steps a-g for each subsequent subprocess of the EDA implementation process and store traced EDA implementation process results in memory.

Other example embodiments include a non-transitory, computer-readable storage medium encoded with instructions that, when executed by at least one hardware processor, cause the at least one hardware processor to perform a method for tracing an original electronic design automation (EDA) implementation process for electronic hardware designs, where the original EDA implementation process includes multiple subprocesses to convert a hardware model to a physically-realized electronic circuit, the method comprising a processing system that includes at least one processor performing the following steps:

inputting a cryptographic key and design information that includes the hardware model and one or more of: constraints, properties, implementation settings, and other directives for directing conversion of the hardware model into the physically-realized circuit;

processing the cryptographic key and design information to generate a sequence of instructions that direct the trace processing module to execute the subprocesses of the EDA implementation process and provide traceability of each subprocess of the EDA implementation process;

for each subprocess of the EDA implementation process, the processing system performing the following steps:
   a—gathering intermediate design state and implementation settings resulting from or influencing execution of the subprocess;
   b—combining the intermediate design state and implementation settings into a data string and determine a cryptographic hash value for the data string;
   c—digitally signing the cryptographic hash value using a digital signature certificate derived from a cryptographic key to generate a signed hash;
   d—storing the signed hash and identifiers associated with data files used for determining the cryptographic hash value to an electronic ledger to generate an updated electronic ledger;
   e—authenticating the signed hash from the electronic ledger to generate an authenticated signed hash;
   f—reconstructing a hash from the data files stored in the electronic ledger to generate a reconstructed hash; and
   g—comparing the authenticated signed hash with the reconstructed hash, and in response to a mismatch, generate an error signal; and repeating the steps a-g for each subsequent subprocess of the EDA implementation process and store traced EDA implementation process results in memory.

The example embodiments described above introduce a selection of concepts that are further described below. It is not intended to identify key features or essential features of the claimed subject matter or to be used to limit the scope of the claimed subject matter; rather, it is intended to provide an overview of the subject matter described in this document. In addition, other features, aspects, and advantages of the subject matter described herein will become apparent from the following description, the figures, and the claims.

Here is a brief summary of the Figures to be described in detail below:

In this application, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Unless the context indicates otherwise, the terms circuitry and circuit refer to structures in which one or more electronic components have sufficient electrical connections to operate together or in a related manner. In some instances, an item of circuitry can include more than one circuit. An item of circuitry that includes one or more processors may sometimes be separated into hardware and software components. In this context, software refers to stored data that controls operation of the processor or that is accessed by the processor while operating, and hardware refers to components that store, transmit, and operate on the data. Circuitry can be described based on its operation or other characteristics. For example, circuitry that performs control operations may be referred to as control circuitry, and circuitry that performs processing operations may be referred to as processing circuitry.

In general, processors, circuitry, and other such items may be included in a system in which they are operated automatically or partially automatically. The term system refers to a combination of two or more parts or components that can perform an operation together. A system may be characterized by its operation.

Figure 10:
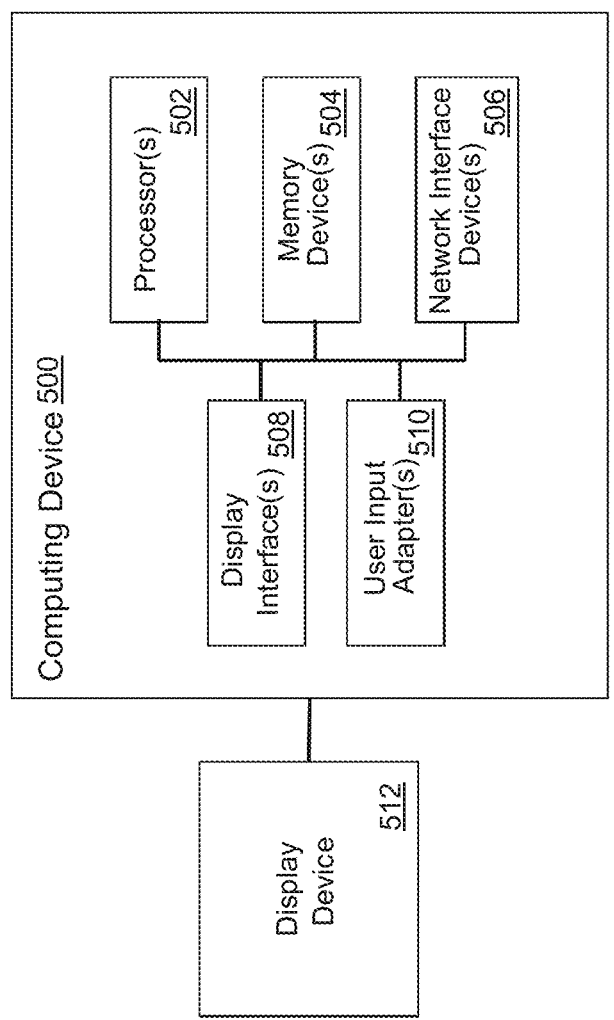
FIG. 10 shows an example computing system that may be used in some embodiments to implement the features shown in and described throughout this document, including those features shown in and described with reference to FIG. 1 through FIG. 9.

Computer-implemented function blocks, functions, and actions may be implemented using software modules. Function blocks, functions, and/or actions performed by software module(s) or processing node(s) are implemented by underlying hardware (such as at least one hardware processor and at least one memory device) according to program instructions specified by the software module(s). FIG. 10 and its description provide details of an example computer system with at least one hardware processor and at least one memory device. In addition, the described function blocks, functions, and actions may be implemented using various configurations of hardware (such as ASICs, PLAs, discrete logic circuits, etc.) alone or in combination with programmed computer(s). References to one of the function blocks, functions, and/or actions performing some action, operation, function, or the like, refers to a computer system like the example computer system in FIG. 10 executing program instructions corresponding to the module to perform that action, operation, or function. Although the computer system may be implemented using a single computing device like that in FIG. 10, the computer system may also be implemented in a cloud-based computer environment and may be implemented across one or more physical computer nodes like the computing device as shown in FIG. 10. In certain examples, different aspects of the computer system 10 may be implemented on virtual machines implemented on corresponding physical computer hardware.

Figure 1:
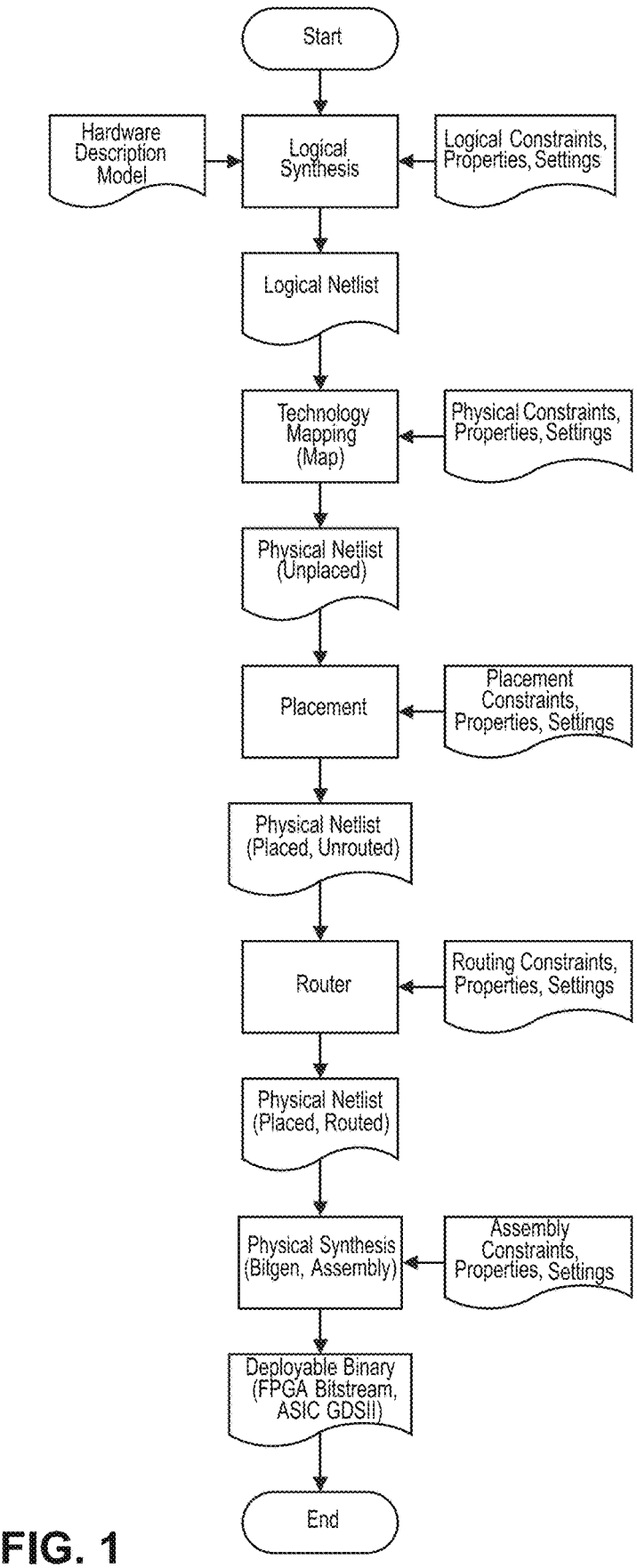
FIG. 1 shows an example processing flow for an EDA implementation process.

An EDA implementation process shown in FIG. 1 converts a high-level model of a desired hardware design into a physically realized circuit that can be programmed as configuration firmware onto a Field Programmable Gate Arrray (FPGA) device or fabricated into an Application Specific Integrated Circuit (ASIC) to perform the desired function. FPGAs and ASICs are two examples of circuits. One example of a hardware design used for illustration in this process is of a neural network.

A hardware description model can be provided in the form of a schematic, block diagram, Hardware Description Language (HDL) source code, or any other high-level description supported by a vendor EDA implementation process. The example neural network can be coded into HDL source code using a HDL such as Verilog, where a developer writes code describing the behavior and structure of each neuron, memories to store the weights, and wires to achieve the desired connectivity. Alternatively, higher level frameworks can be used that allow abstract definition of the network either dataflow graphs or directly as a network of neurons.

This model is then converted into a logical netlist via a logical synthesis process that is bounded by logical constraints and influenced by properties and settings such as target operating frequency, state-encoding for finite state machines, and whether the synthesis process should automatically infer the instantiation of larger logical structures such as Digital Signal Processing (DSP) blocks when it detects certain arithmetic operations. The logical netlist describes the hardware description model's functionality using a list of components including logical gates (e.g., AND, OR, NOT, etc.), registers, and other primitives and a list of networks (nets) that define how those components are interconnected. For the neural network example, each neuron is translated to logical components capable of performing the weight lookups and mathematical computations, and the nets describe the connectivity between the neurons that define the network structure.

Following synthesis, the technology mapping stage, (shortened to mapping or map), converts the logical netlist components into physical primitives and cells that can be supported by the targeted FPGA or ASIC technology. For FPGAs, mapping includes translating to specific configurable logic primitives that exist on the target FPGA device including Look Up Tables (LUTs), Digital Signal Processing (DSP) blocks, and Random-Access Memories (RAMs). A neuron for example may be translated to a grouping of a DSP block to perform a multiply accumulate mathematical function and a RAM to store the weights. When targeting an ASIC, the map converts the logical components to an optimized transistor configuration or to a set of primitive cells from a cell library that are pre-configured for the desired manufacturing process. This could even include pre-built tensor cores to support neural network implementation. The output product of the map subprocess is a physical netlist which differs from the logical netlist in that the components now correlate to physical resources that can be allocated on the target hardware technology.

A placement subprocess arranges the physical layout of the technology mapped components in a manner that aims to optimize amongst various physical constraints, properties, and settings including area consumed, operating frequency (timing), power consumption, and ability to route the design. Placement operations may rely on a random seed value for a Pseudo Random Number Generator (PRNG) that introduces stochastic behavior in the placement process to escape locally optimal solutions. This placement subprocess arranges the neurons on the target FPGA in a manner that enables the desired network connectivity while operating within the other constraints. The placement subprocess for ASICs is similar except there may be different emphasis in constraints when balancing area consumed versus performance and ease of routing. The placement process annotates the Physical Netlist with the desired location of a specific physical resource on the target hardware technology. This location will be specified using X, Y, and increasingly Z coordinates to represent the location of each physical resource on the placement grid supported by the target technology.

Once the design, a physical netlist, is placed, a Router subprocess attempts to connect the physical components together to enable the desired operation of the circuit. This subprocess must consider constraints, properties, and settings that influence operating frequency (timing) and power consumption, e.g., by finding shorter routes for signals that change more frequently. Router operations often rely on a random seed value for a PRNG that introduces stochastic behavior in the placement process to escape locally optimal solutions. Whereas a net simply defined that a connection exists between two components, the physical netlist will now be updated with specific information related to how each component is connected. For FPGAs, this includes a list of Programmable Interconnect Points (PIPs) that programmatically control connections between physical wires, switchbox and multiplexer configurations, and potentially configuration information for a more sophisticated Network on Chip (NoC) style architecture. For ASICs the physical netlist would now detail the construction of actual physical wires and routing channels that would enable the desired connections. Once the router completes, all the neurons are connected with the desired structure.

Finally, a Physical Synthesis subprocess, sometimes referred to as Bitstream Generation, Assembly, or GDSII/OASIS layout depending on the target technology, converts the physical netlist into something that can be deployed on the target technology. For FPGAs, the Physical Synthesis subprocess generates a configuration bitstream that can be loaded onto the target device to enable the desired functionality, and for ASICs, the Physical Synthesis subprocess generates the final device layout in a GDSII or OASIS format that can be sent to a fabrication facility to build a physical device that implements the circuit. Once the FPGA bitstream is programmed to the device, or the ASIC is received from the factory and powered on, the process of converting a high-level model to a physical, functional neural network is complete.

While the process in FIG. 1 shows the hardware models, constraints files, and other implementation directives being supplied as distinct inputs, EDA vendor implementation processes expect these data to be collected in a centralized "Project" container that contains references to or copies of the data and directives that influence the EDA implementation process. A Project container may also be used to keep track of the design implementation state as the process proceeds, including which subprocesses are completed, along with references to the relevant output products of each subprocess such as netlists and log files. The Project container can be implemented as a single file that references external data, a fixed directory structure with defined paths for relevant data, or an archive that contains all relevant files among other forms.

The process in FIG. 1 is simplified and generalized to capture the similarities within a wide array of EDA vendor implementation processes targeting a large and diverse set of target hardware technologies. Different EDA vendors may use different naming conventions, may combine or add additional subprocesses (i.e. timing and power analysis), and produce or consume different forms of data during the implementation process. For example, while some EDA vendors produce distinct data files representing the logical and physical netlists, others store the netlist information in more abstract databases or design checkpoint archives that get updated as each subprocess executes. To generalize the following description, the data produced or updated by each subprocess represents the state of the EDA design implementation after execution of that subprocess, and therefore, be referred to as the "intermediate design state."

Similarly, different vendors have different naming conventions, and different, often redundant methods for specifying implementation directives, referring to them as settings, properties, and constraints among other things. These differences are further complicated by the fact that most vendors offer batch scripting mechanisms, such as Tcl interpreters, that allow users to programmatically direct the EDA implementation process with custom directives. Implementation processes can also be affected by arguments passed via the command-line interface (CLI) or Environment Variables within the host operating system. These properties can also be specified globally (applying to an entire design and multiple implementation subprocesses) or locally (applying specific design attributes or specific subprocesses) via the Project container or Tcl implementation script. To simplify the description below, any type of constraint, property, setting, directive, or CLI argument that can influence the implementation process will be referred to as an "implementation setting."

As the complexity of microelectronic hardware designs and devices grows, the vulnerability and attack surface during the design and implementation process also grows larger and more complex. The proliferation of Advanced Persistent Threat (APT) Groups, often with nation-state level resources poses a problem for the development of trusted microelectronic hardware designs. An undetected malicious actor on an organization network with access to compromised development machines and/or shared filesystems could compromise the integrity of a hardware, software, or firmware design at any stage of the design and implementation process.

Figure 2:
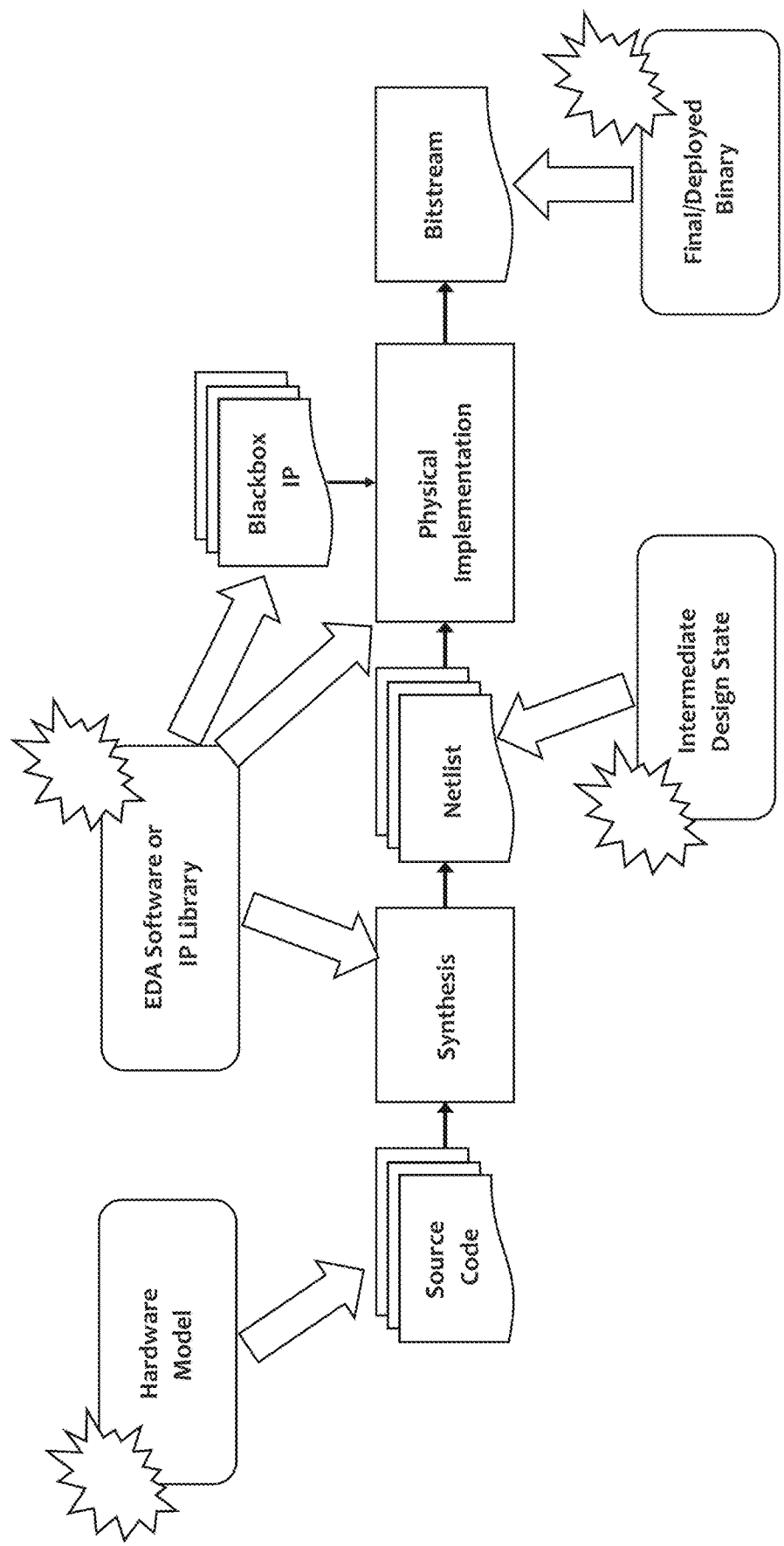
FIG. 2 shows an example "attack surface" of an FPGA implementation flow where the security, accuracy, and/or reliability of the FPGA implementation may be comprised.

FIG. 2 shows an example attack surface of a typical FPGA implementation flow (see FIG. 1 explained above) where an attacker can pick and choose where to attack the implementation process to maximize the impact of an attack and minimize the risk of detection. The initial hardware model that describes the desired operation of the EDA design can be attacked (represented by the broken symbol) by modifying the HDL source code prior to synthesis. The behavior of the hardware EDA implementation can also be affected by modifying (attacking) an intermediate design state, such as the netlist, where it resides in computer system storage in between execution of the subprocesses in FIG. 1. In addition, the final deployed binary, e.g., an FPGA configuration or GDSII ASIC layout file, can also be modified (attacked) to alter the functionality of the design. Indirect attacks on the hardware EDA implementation can also be executed by modifying the EDA vendor software or a third-party IP Library to insert malicious or otherwise unwanted behavior. For example, an implementation subprocess such as Synthesis could be modified to alter the functionality of the design.

Verification software, such as Formal Equivalence Checking (FEC) and property checking software, can verify that an implemented physical netlist (following the place and route subprocesses in FIG. 1) is equivalent to the initial hardware model specification, but these software tools only take a snapshot of the trustworthiness of a design implementation at a specific moment in time and do not account for assuring the integrity of the design beyond that snapshot. A sophisticated attacker can modify the physical netlist or configuration bitstream after verification has completed, and as a result, such an attack is undetected.

What is needed is a computer system that ensures the integrity of the intermediate design state and the configuration bitstream post-verification. In addition, the computer system needs to protect against being bypassed if the attacker modified the EDA software installation or Intellectual Property (IP) libraries such that malicious behavior or vulnerabilities are hidden within IP dependencies or inserted by the implementation subprocesses themselves. Still further, vulnerabilities and backdoors inserted knowingly or unknowingly by using incorrect implementation settings need to be detected as well.

To maximize coverage of this attack surface, the computer system described below preserves and traces the integrity of the intermediate state data, implementation settings, and final binary files throughout the entire EDA implementation process in a manner that generates an audit trail that can be verified at any point in the future. The audit trail includes tamper-evident mechanisms that anticipate an advanced attacker that attempts to cover the attacker's tracks. The computer system also detects more sophisticated attacks that indirectly modify design implementation data by compromising EDA implementation software or IP libraries. Ultimately, the computer system described below provides one or more of traceability, auditability, and reproducibility that, individually and in combination, verifies the integrity and assures the trustworthiness of the final deployed binary, and assists compliance regimes in fields such as defense, aerospace, and medicine where safety and security are paramount.

Traceability is defined as capture and preservation of an initial hardware model, intermediate design state information, and the settings utilized during the EDA implementation process along with the sequence of instructions and subprocesses that produced the intermediate design state and final output products. A traceable EDA implementation process generates a permanent trace record of the process with tamper-evident seals that enables the verification of data integrity and thus detection of tampering within a design flow such as the one illustrated in FIG. 1. An analogy for traceability (useful for illustration and not limitation) might be similar to capturing the ingredients for a recipe (e.g., the hardware model), the recipe itself (e.g., sequence of instructions, subprocesses, and settings), and taking snapshots of the progress in between steps (e.g., subprocesses) in the recipe that led to the final output product in an EDA implementation process. This allows an outside observer to not only verify that the recipe was followed correctly and not tampered with at any point, but also enables the observer to exactly reproduce the process.

Traceability of an EDA implementation process further enables the auditability and reproducibility of that process. Auditability is defined as the ability to retrace the steps taken during an EDA implementation process, such as the one illustrated in FIG. 1, and ensure that they were executed by the expected party, using the expected settings, and that none of the preserved intermediate design state, settings, final output product, or trace record data was tampered with during or after the traceable implementation process. Continuing with the illustrative recipe analogy above, auditability includes retracing the steps (e.g., subprocesses) followed in the recipe (e.g., sequence of instructions, subprocesses, and settings), verifying that the recipe was followed correctly, and verifying that at no point in the process were any of the ingredients (e.g., the hardware model, intermediate products, final output product) tampered with. One example of tampering in the recipe analogy detectable using the auditing technology described below is tampering with an oven thermostat.

Reproducibility is defined as the ability of another entity to generate the same result as the original EDA implementation process using independent facilities. In other words, an EDA implementation process such as the one depicted in FIG. 1 can be retraced following the exact same sequence of instructions and subprocesses with the same hardware model and settings on an independent computer system to verify that the exact same final output product (e.g., FPGA configuration bitstream or ASIC GDSII layout file) is produced. Continuing with the illustrative recipe analogy above, reproducibility includes executing the same recipe, with the same ingredients, using independent facilities (e.g., a different oven) and ensuring that the final product is the same. Traceability and auditability help ensure data and process integrity. Reproducibility helps confirm the integrity of the computing system and the EDA implementation software installation that could otherwise be modified to affect the implementation process.

Figure 3:
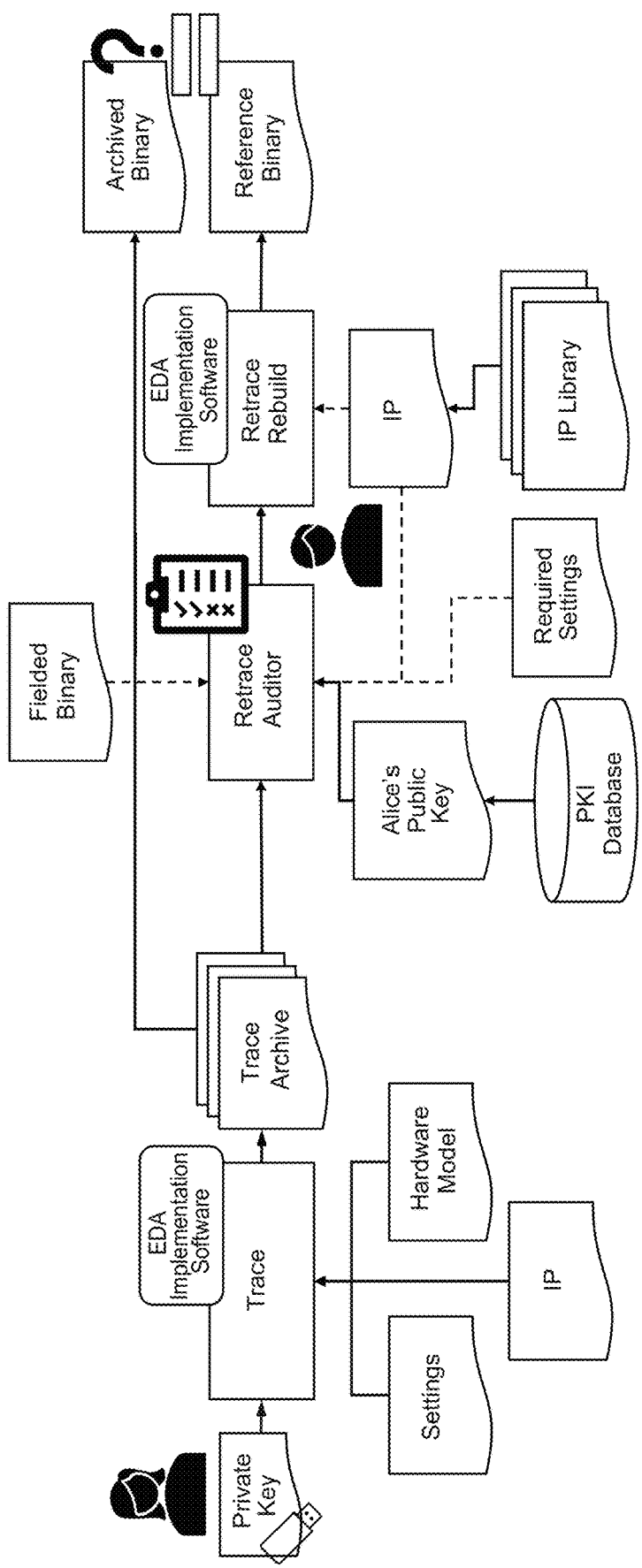
FIG. 3 is an example trace and retrace computer system for traceability, auditability, and reproducibility of an EDA implementation in accordance with example embodiments.

FIG. 3 is an example "trace and retrace" computer system that provides traceability, auditability, and reproducibility of an EDA implementation in accordance with example embodiments. The traceability, auditability, and reproducibility functions of the trace and retrace computer system protect, for example, the attack surfaces shown in FIG. 2.

The trace and retrace computer system takes as input an EDA implementation designer's private encryption key (Alice is such an example entity with a private key) along with the hardware model, any third-party IP, and EDA implementation settings, which are typically included in a "project container" that may also be directly input and processed by the trace and retrace computer system. The trace and retrace computer system may use scripting APIs (such as Tcl) used by EDA implementation software vendors to control the EDA implementation process and to query the EDA implementation software for implementation settings and intermediate design state.

Figure 4:
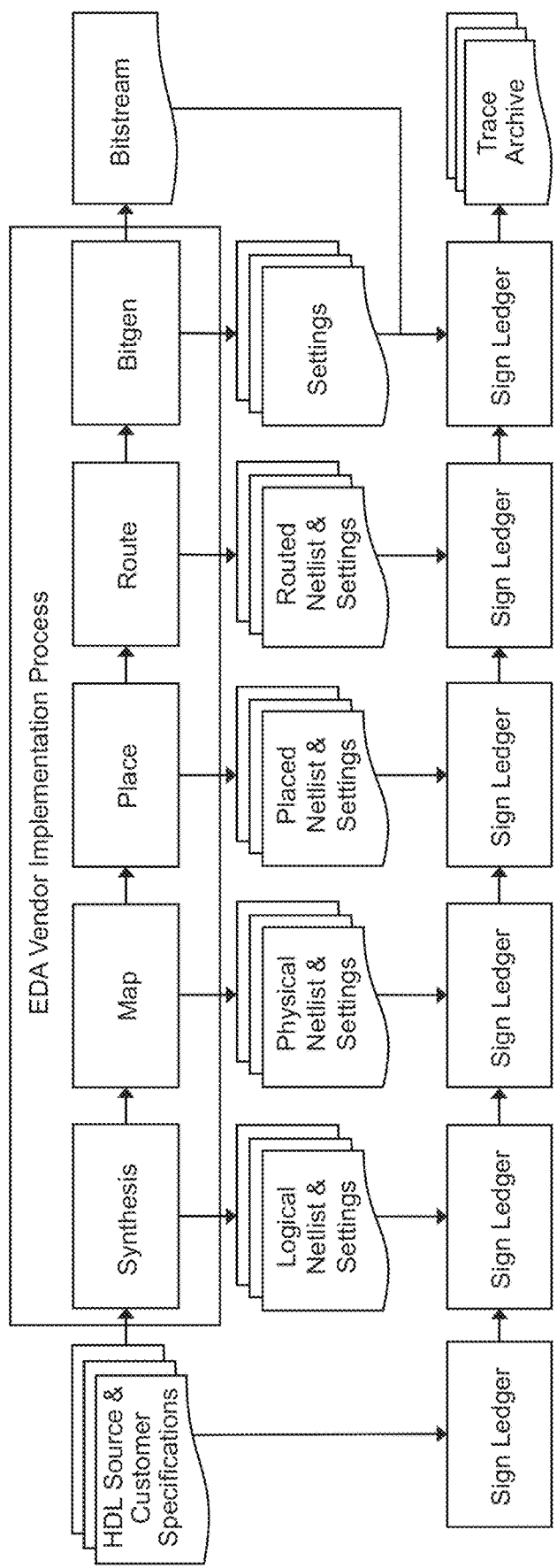
FIG. 4 is an overview of trace-augmented build flow in accordance with example embodiments.
Figure 5:
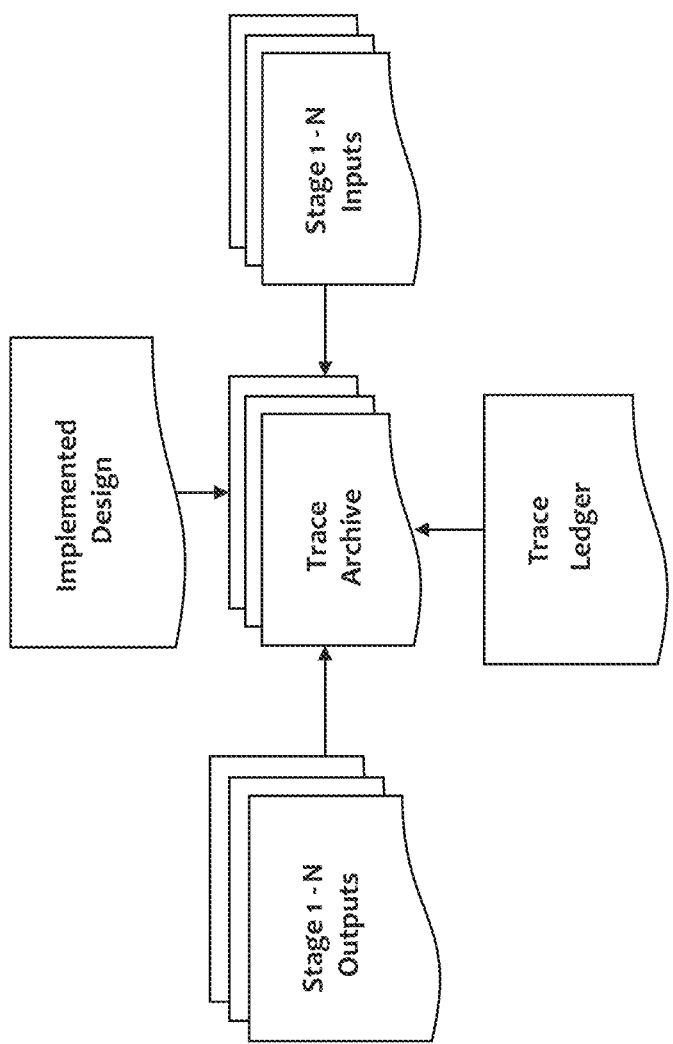
FIG. 5 shows an example trace archive in accordance with example embodiments.

The Trace processing module in FIG. 3 augments the subprocesses within an EDA implementation process, such as the one depicted in FIG. 1, by inserting instructions that enable traceability. It does so by generating a sequence of computer instructions that directs EDA implementation software to implement the hardware design, and in doing so, gathers intermediate design state data, implementation settings, and final outputs from the EDA implementation process, and then cryptographically hashes and signs them using Alice's private key to enable authentication and integrity verification. The information gathered by the Trace module is stored in a Trace Archive (memory) along with an electronic ledger containing the hash values, signatures, and references to captured data files used to calculate the hash values. More detailed examples of how the Trace processing module may operate are depicted in FIG. 4 and FIG. 5, with the hashing and signature approach depicted in FIG. 7 as described below. The Trace Archive is accessible by Retrace Auditor and Retrace Rebuild processing modules now described.

The Retrace Auditor processing module in FIG. 3 enables auditability by a second independent party (independent from a first party that generated the original EDA implementation). The Retrace Auditor processing module retrieves the contents of the Trace Archive for the EDA implementation being retraced, queries Alice's public key from a public key infrastructure (PKI) database, uses the public key to authenticate the hash values from the Trace electronic ledger stored in the Trace Archive, and then compares the authenticated hash values to hash values recalculated from data stored in the Trace Archive. Loading Alice's public key from an independent PKI database thwarts a class of attacks where someone who is not Alice runs the traceable implementation process, modifies the hardware design implementation, signs with their own private key, and replaces the Trace Archive with their own compromised version.

The Retrace Auditor processing module can optionally input a fielded binary (e.g., a configuration bitstream read back from a deployed FPGA system) and compare it to the final binary generated by the original EDA implementation process that is contained in the Trace Archive. The Retrace Auditor processing module may also optionally input a Required Settings file and compare the settings in that file to the captured settings contained in the Trace Archive. A more detailed description of how the Retrace Auditor processing module authenticates and verifies hash values, and settings, and thus data and process integrity, is described below in conjunction with FIG. 9.

Reproducibility is enabled via the Retrace Rebuild processing module in FIG. 3 which allows a second or third independent party to reproduce the EDA implementation process on an independent computing system and compare the results to the results of the original EDA implementation process that are contained in the Trace Archive. The Retrace Rebuild processing module retrieves the contents of the Trace Archive and generates a sequence of computer instructions that directs the EDA implementation software to fully implement the hardware design using the same hardware model and implementation settings that were captured from the original EDA implementation process execution stored in the Trace Archive. The final output from this independently executed EDA implementation process is referred to as the Reference Binary in FIG. 3. The Reference Binary is compared to the Archived Binary which is the final output from the original EDA implementation process stored in the Trace Archive. If the Reference and Archived binaries are identical, then the EDA Software or IP Library class of attacks depicted in FIG. 2 cannot succeed unless the attacker has compromised both the original computing system as well as independent computing systems used by the second and third parties in the same manner. The Retrace Rebuild processing module can also detect a class of attacks where Alice herself maliciously modifies the intermediate design state or output file because the Reference Binary would not match the Archived Binary in that situation.

An example of the process described above using a typical FPGA EDA implementation process starting with HDL source code and resulting in a configuration bitstream is illustrated in FIG. 4, which shows a trace-augmented build flow in accordance with example embodiments. In the example of FIG. 4, the Trace processing module in the trace and retrace computer system of FIG. 3 first captures the HDL Source code and specification data files for an EDA implementation prior to the synthesis subprocess from a computer storage system, and "Signs the Ledger" by calculating a hash value over them, cryptographically signing the hash value, and adding the signed hash value to the electronic ledger. This procedure is repeated for each implementation subprocess where the intermediate design state in the form of the logical netlist, physical netlist, placed physical netlist, and routed physical netlist is captured along with the relevant implementation settings and used to calculate a hash value and sign the ledger in between synthesis, map, place, and route subprocesses, respectively.

The process in FIG. 4 culminates after the Bitgen subprocess, where the produced configuration bitstream and the implementation settings used to produce it are also hashed, and that hash is then cryptographically signed and recorded in the electronic ledger. In this example, the intermediate design state in the form of logical or physical netlists can be captured, for example, by preserving the state of the respective file as it resides on a computer storage system at a specific point in time, or by generating a sequence of instructions that leverages vendor scripting interfaces such as a Tcl console to explicitly query the current state of the design implementation and implementation settings.

The ability to query the EDA vendor implementation software for specific settings is beneficial as some EDA implementation subprocesses have default internal settings that affect subprocess execution. One such example is that often a subprocess, such as placement and routing, relies on stochastic behavior during optimization to escape local minima and will uses a random seed value to initialize the pseudo-random number generator that optimization algorithms rely on. The trace and retrace computer system ensures that such information like the random seed values is gathered for reproducibility. The Trace processing module also gathers information about the original EDA implementation computer system including its operating system version, EDA vendor implementation software versions, and the computing platform using documented software APIs. This information can influence the EDA implementation process and collecting them increases the likelihood of successfully demonstrating reproducibility.

Example contents of the Trace Archive are illustrated in FIG. 5. For each implementation Stage (e.g., each subprocess from FIG. 1) 1-N, the inputs (hardware model, previous Stage (subprocess) intermediate design state, and implementation settings) to the Stage are gathered in the Trace Archive along with the outputs to the Stage (current Stage intermediate design state). The final implemented design, for example in the form of an FPGA configuration bitstream of ASIC GDSII layout file, is also stored in the Trace Archive along with the electronic Trace Ledger containing all the cryptographically signed hash values.

Figure 6:
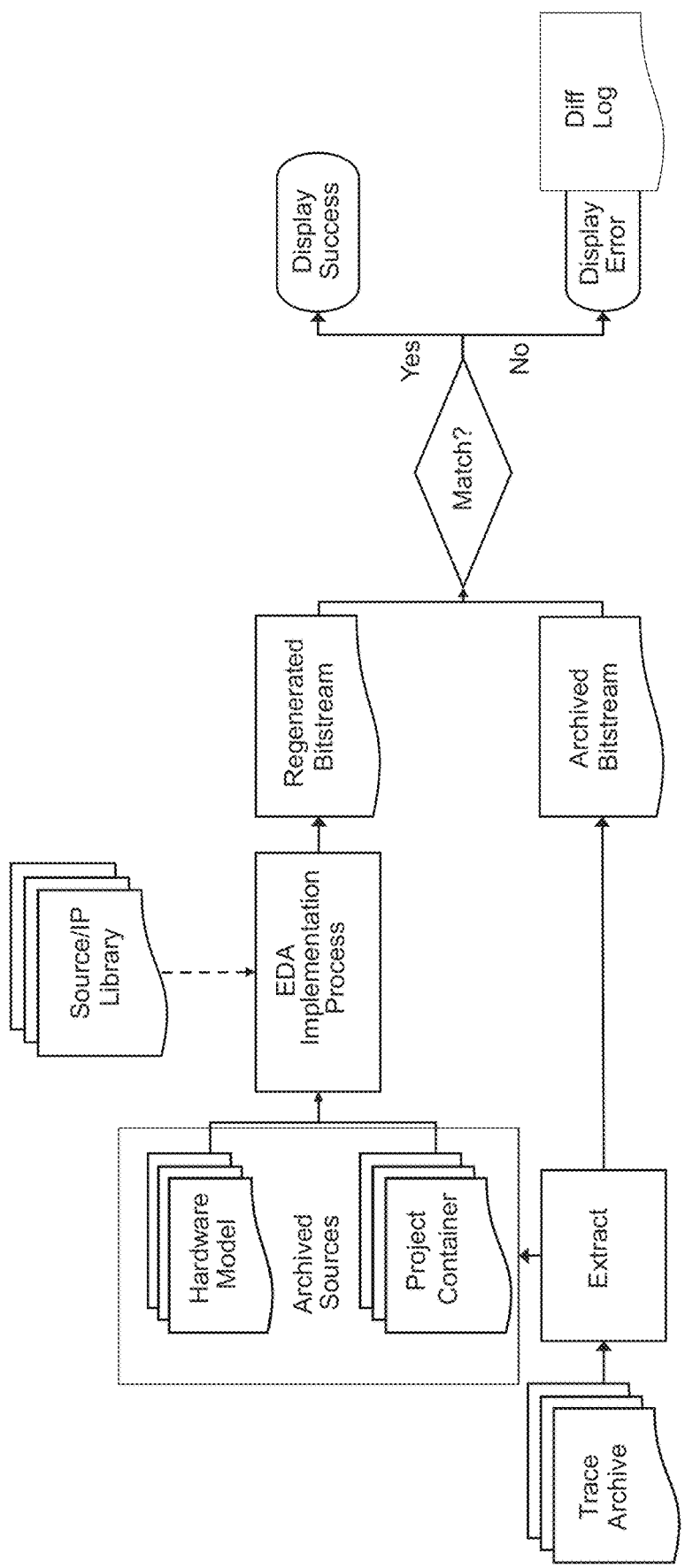
FIG. 6 shows an example reproducible build operation in accordance with example embodiments.

An example operation of the Retrace Rebuild (reproducible build) processing module is illustrated in FIG. 6. The Retrace Rebuild processing module accesses the Trace Archive and retrieves a Project Container that contains information (directives) on how the EDA implementation process should proceed and the initial hardware model that was used in the traced EDA implementation process by the Trace processing module that produced the Trace Archive. Using these as input, the EDA implementation process is re-executed, in the same order, with the same implementation settings as those from the original EDA implementation process that are contained in the Trace Archive. Optionally, an independent copy of the HDL source or IP library can be provided as input to account for classes of attacks where the HDL source or IP libraries were modified.

The re-executed EDA implementation process produces a Regenerated Bitstream that is then compared to the Archived bitstream extracted from the Trace Archive. If the two configuration bitstreams match, then a notification or other signal is generated to indicate (e.g., display) the match; otherwise, an error signal is generated (e.g., displayed) preferably along with a data log identifying where and/or how the mismatch occurred. Because the Retrace Rebuild processing module reproduces the EDA implementation process on an independent system (as part of a layered security approach), the chances of a successful attack that targets the EDA implementation software as it resides on a computer storage system are greatly decreased since the attacker would have to compromise multiple systems and multiple EDA implementation software installations. For example, if an attacker modified the Synthesis subprocess to insert backdoors into a hardware design implementation, the attacker would have to modify the Synthesis subprocess on multiple independent computing systems that may be distributed across an organization or multiple organizations.

Figure 7:
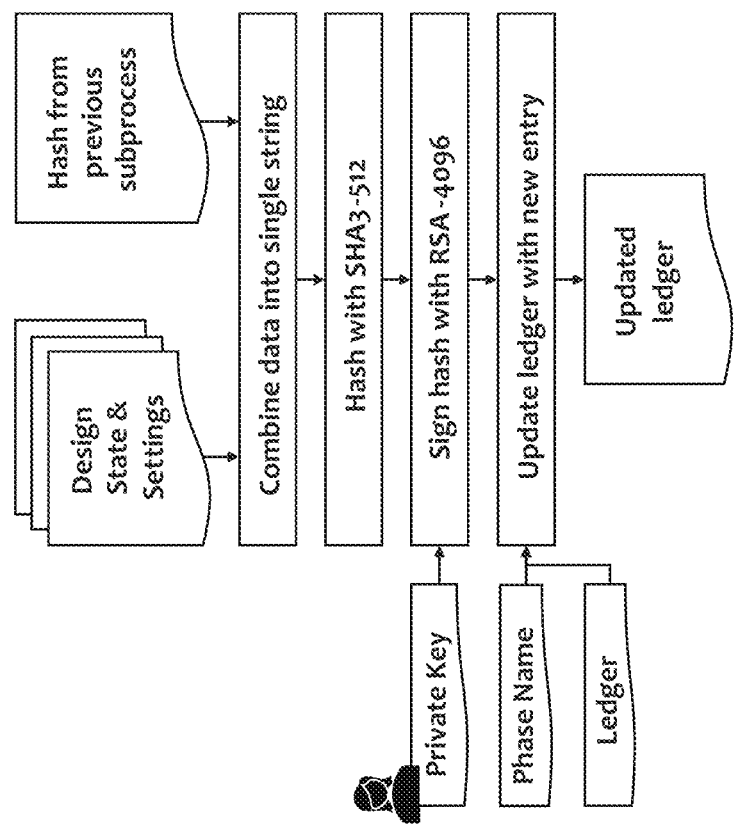
FIG. 7 shows an example signature process in accordance with example embodiments.

The process illustrated in FIG. 7 is an example of how the signature, authentication, and tamper-evident features implemented within the Trace processing module of the trace and retrace computer system in FIG. 3 operate in accordance with example embodiments. After the completion of each EDA implementation subprocess (see FIG. 1), the captured design state and implementation settings are combined with the hash value calculated for the previous subprocess into a single string of data over which a cryptographic hash is calculated. This hash value is then signed using a cryptographic signing mechanism and the signed hash value is appended to the electronic ledger along with reference to the data used for calculating the hash.

Figure 8:
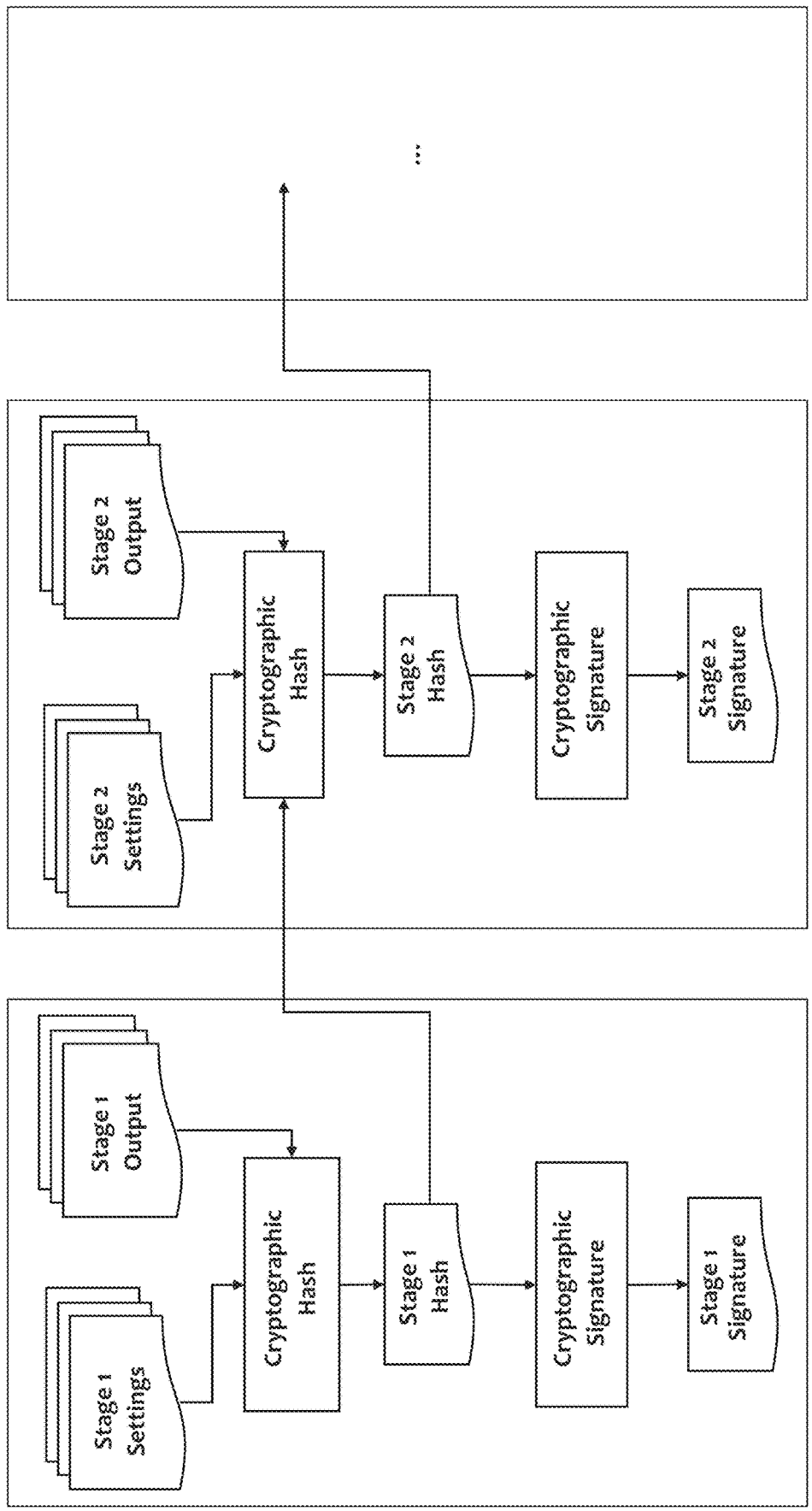
FIG. 8 shows an example blockchain process in accordance with example embodiments.

By integrating the hash from one or more previous subprocesses, the signatures may be chained together to create a blockchain as illustrated in an example in FIG. 8. This blockchain increases the robustness of the tamper-evident mechanism in the trace and retrace computer system shown in FIG. 3. If an attacker wanted to modify a specific implementation Stage (subprocess), the attacker could modify the intermediate design state for that stage, and then attempt to find a hash collision that would result in the same hash value and thus the same signature value. This is computationally expensive, but it may be feasible for a well-funded attacker. However, when the hash values are made dependent on the hash value of the previous stage, the attacker must now compute the collisions and reconstruct the hash chain for the entire sequence going back to first stage which is very likely to be computationally infeasible.

Figure 9:
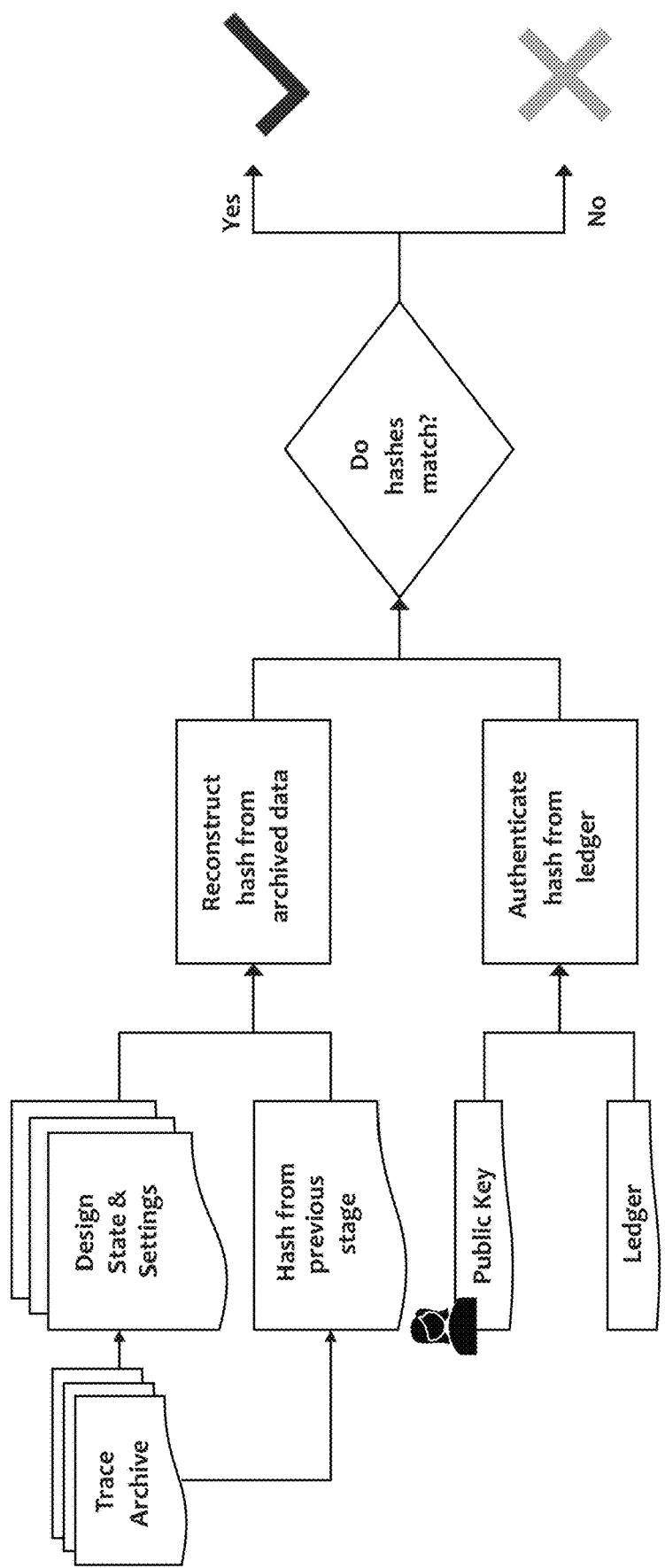
FIG. 9 shows an example authentication and hash verification process in accordance with example embodiments.

FIG. 9 shows an example authentication and hash verification process described above for FIG. 3 in accordance with example embodiments. To verify the integrity of the files, the signature of the hash is authenticated using Alice's public key and then the hash is recalculated from the Design State and Settings data. The authenticated hash is then compared to the reconstructed hash to verify that the Design State and Settings data were not modified. This procedure is executed in between subprocesses by the Trace processing module in FIG. 3 to ensure that intermediate design state was not tampered with prior to execution of the next subprocess. It is also executed within the Retrace Auditor processing module in FIG. 3, once for each subprocess, to verify the integrity of the intermediate design state data and implementation settings associated with that subprocess.

Along with verifying that the implementation settings were not tampered with, the Retrace Auditor processing module also provides mechanisms for verifying that the correct implementation settings were used during the EDA implementation process. The Retrace Auditor processing module provides both automated inspection and enables manual inspection of the implementation settings via a user interface (not shown). A user can provide a list of required settings that apply to specific subprocesses, and the Retrace Auditor processing module compares those to the settings used for those subprocesses in the EDA implementation process contained in the Trace Archive. The Retrace Auditor processing module also allow visibility into all the settings applied during the EDA implementation process enable an end user to filter according to subprocess and execute queries across all subprocesses for specific settings of interest.

FIG. 10 illustrates an example computer system 500 that may be used according to some embodiments to implement the modules and the operations of the trace and retrace computer system. In some embodiments, the computing device 500 includes one or more of the following: one or more processors 502; one or more memory devices 504; one or more network interface devices 506; one or more display interfaces 508; and one or more user input adapters 510. Additionally, in some embodiments, the computing device 500 is connected to or includes a display device 512. As will be explained below, these elements (e.g., the processors 502, memory devices 504, network interface devices 506, display interfaces 508, user input adapters 510, display device 512) are hardware devices (for example, electronic circuits or combinations of circuits) that are configured to perform various different functions for the computing device 500.

In some embodiments, each or any of the processors 502 is or includes, for example, a single-core or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 502 uses an instruction set architecture such as x86 or Advanced RISC Machine (ARM).

In some embodiments, each or any of the memory devices 504 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 502). Memory devices 504 are examples of non-volatile computer-readable storage media.

In some embodiments, each or any of the network interface devices 506 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 508 is or includes one or more circuits that receive data from the processors 502, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 512, which displays the image data. Alternatively or additionally, in some embodiments, each or any of the display interfaces 508 is or includes, for example, a video card, video adapter, or graphics processing unit (GPU).

In some embodiments, each or any of the user input adapters 510 is or includes one or more circuits that receive and process user input data from one or more user input devices (not shown) that are included in, attached to, or otherwise in communication with the computing device 500, and that output data based on the received input data to the processors 502. Alternatively or additionally, in some embodiments each or any of the user input adapters 510 is or includes, for example, a PS/2 interface, a USB interface, a touchscreen controller, or the like; and/or the user input adapters 510 facilitates input from user input devices (not shown) such as, for example, a keyboard, mouse, trackpad, touchscreen, etc.

In some embodiments, the display device 512 may be a Liquid Crystal Display (LCD) display, Light Emitting Diode (LED) display, or other type of display device. In embodiments where the display device 512 is a component of the computing device 500 (e.g., the computing device and the display device are included in a unified housing), the display device 512 may be a touchscreen display or non-touchscreen display. In embodiments where the display device 512 is connected to the computing device 500 (e.g., is external to the computing device 500 and communicates with the computing device 500 via a wire and/or via wireless communication technology), the display device 512 is, for example, an external monitor, projector, television, display screen, etc.

In various embodiments, the computing device 500 includes one, or two, or three, four, or more of each or any of the above-mentioned elements (e.g., the processors 502, memory devices 504, network interface devices 506, display interfaces 508, and user input adapters 510). Alternatively or additionally, in some embodiments, the computing device 500 includes one or more of: a processing system that includes the processors 502; a memory or storage system that includes the memory devices 504; and a network interface system that includes the network interface devices 506.

The computing device 500 may be arranged, in various embodiments, in many different ways. In various embodiments, the computing device 500 includes one, or two, or three, four, or more of each or any of the above-mentioned elements (e.g., the processors 502, memory devices 504, network interface devices 506, display interfaces 508, and user input adapters 510). Alternatively, or additionally, in some embodiments, the computing device 500 includes one or more of: a processing system that includes the processors 502; a memory or storage system that includes the memory devices 504; and a network interface system that includes the network interface devices 506. Alternatively, or additionally, in some embodiments, the computing device 500 includes a system-on-a-chip (SoC) or multiple SoCs, and each or any of the above-mentioned elements (or various combinations or subsets thereof) is included in the single SoC or distributed across the multiple SoCs in various combinations. For example, the single SoC (or the multiple SoCs) may include the processors 502 and the network interface devices 506; or the single SoC (or the multiple SoCs) may include the processors 502, the network interface devices 506, and the memory devices 504; and so on. Further, the computing device 500 may be arranged in some embodiments such that: the processors 502 include a multi- (or single)-core processor; the network interface devices 506 include a first short-range network interface device (which implements, for example, WiFi, Bluetooth, NFC, etc.) and a second long-range network interface device that implements one or more cellular communication technologies (e.g., 3G, 4G LTE, CDMA, etc.); and the memory devices 504 include a RAM and a flash memory. As another example, the computing device 500 may be arranged in some embodiments such that: the processors 502 include two, three, four, five, or more multi-core processors; the network interface devices 506 include a first network interface device that implements Ethernet and a second network interface device that implements WiFi and/or Bluetooth; and the memory devices 504 include a RAM and a flash memory or hard disk.

As previously noted, whenever it is described in this document that a module or process performs any action, the action is in actuality performed by underlying hardware elements according to the instructions that comprise the module. As stated above, the various modules of the trace and retrace computer system, each of which will be referred to individually for clarity as a "component" for the remainder of this paragraph, are implemented using an example of the computing device 500 of FIG. 10. In such embodiments, the following applies for each component: (a) the elements of the computing device 500 shown in FIG. 10 (i.e., the one or more processors 502, one or more memory devices 504, one or more network interface devices 506, one or more display interfaces 508, and one or more user input adapters 510), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 504 (e.g., in various embodiments, in a volatile memory device such as a RAM or an instruction register and/or in a non-volatile memory device such as a flash memory or hard disk) and all actions described herein as performed by the software modules are performed by the processors 502 in conjunction with, as appropriate, the other elements in and/or connected to the computing device 500 (i.e., the network interface devices 506, display interfaces 508, user input adapters 510, and/or display device 512); (c) alternatively or additionally, to the extent it is described herein that the component processes and/or otherwise handles data, in some embodiments, such data is stored in the memory devices 504 (e.g., in some embodiments, in a volatile memory device such as a RAM and/or in a non-volatile memory device such as a flash memory or hard disk) and/or is processed/handled by the processors 502 in conjunction with, as appropriate, the other elements in and/or connected to the computing device 500 (i.e., the network interface devices 506, display interfaces 508, user input adapters 510, and/or display device 512); (d) alternatively or additionally, in some embodiments, the memory devices 502 store instructions that, when executed by the processors 502, cause the processors 502 to perform, in conjunction with, as appropriate, the other elements in and/or connected to the computing device 500 (i.e., the memory devices 504, network interface devices 506, display interfaces 508, user input adapters 510, and/or display device 512), each or any combination of actions described herein as performed by the component and/or by any software modules described herein as included within the component.

The hardware configurations shown in FIG. 10 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 10, (e) via other hardware arrangements, architectures, and configurations, and/or via combinations of the technology described in (a) through (e).

The trace and retrace computer system captures the relevant files and settings of EDA implementation processes (e.g., for FPGA and ASIC EDA implementation processes) and preserves and verifies their integrity in a manner that enables tamper detection, audit functionality, and the ability to reliably rebuild identical designs. Vendor tools may be queried to gather implementation settings during the implementation process and the Retrace Auditor module allows the user to confirm that those implementation settings matched required security settings. The trace and retrace computer system integrates with and controls EDA vendor implementation processes to ensure that all necessary information is captured for auditing and exact rebuild and does so without affecting the performance of the implemented hardware; nor does it unduly effect the runtime of the EDA implementation process or affect traditional development workflows.

There are many technical advantages of the subject matter described above, some examples of which are now described. The technological improvements offered by the technology described in this application can be applied for example to ASIC and FPGA design flows to improve trust assurance in the deployed hardware design. One important advantage over existing EDA verification solutions that verify the trustworthiness of a hardware design implementation at a specific point in time is that the trace and retrace computer system provides a full trace of the EDA implementation process that persists in time and can be audited at any point in time in the future. In addition, the trace and retrace computer system can be used in conjunction with those existing EDA verification solutions, treating them as another subprocess within the EDA implementation process and incorporating the results of any trust assessment they might generate in the Trace Archive. This prevents the need to constantly rerun the computationally expensive trust assessment because the Trace Archive and Retrace Auditor processing module assure that the design was not modified after the assessment took place. This is further enhanced by the tamper evident mechanisms that make it difficult for an attacker to modify the hardware design implementation or the Trace Archive itself and cover their tracks successfully. In contrast to existing EDA implementation processes that do not provide independently-verifiable integrity mechanisms, the Trace and Retrace computer system does so, and functions across a variety of EDA vendor implementation software and can target a variety of hardware technology targets. Moreover, the Trace and Retrace computer system addresses and detects attack vectors that are not addressed by existing verification solutions.

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a flash memory, a magnetic medium such as a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Although process steps, algorithms or the like, including without limitation with reference to FIGS. 1-10, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computer system for tracing an original electronic design automation (EDA) implementation process for electronic hardware designs, where the original EDA implementation process includes multiple subprocesses to convert a hardware model to a physically-realized electronic circuit, the computer system comprising:
   at least one computer including at least one hardware processor; and
   storage to store instructions executable in the at least one computer that, when executed by the at least one hardware processor, cause a trace processing module implemented by the at least one computer to:

input a cryptographic key and design information that includes the hardware model and one or more of: constraints, properties, implementation settings, and other directives for directing conversion of the hardware model into a physically realized circuit;

process the input cryptographic key and design information and generate a sequence of instructions that direct the trace processing module to execute the subprocesses of the EDA implementation process and provide traceability of each subprocess of the EDA implementation process;

for each subprocess of the EDA implementation process, perform the following steps:

a—gather intermediate design state and implementation settings resulting from or influencing execution of the subprocess;

b—combine the intermediate design state and implementation settings into a data string and determine a cryptographic hash value for the data string;

c—digitally sign the cryptographic hash value using a digital signature certificate derived from a cryptographic key to generate a signed hash;

d—store the signed hash and identifiers associated with data files used for determining the cryptographic hash value to an electronic ledger to generate an updated electronic ledger;

e—authenticate the signed hash from the electronic ledger to generate an authenticated signed hash;

f—reconstruct a hash from the data files stored in the electronic ledger to generate a reconstructed hash;

g—compare the authenticated signed hash with the reconstructed hash, and in response to a mismatch, generate an error signal; and repeat the steps a-g for each subsequent subprocess of the EDA implementation process and store traced EDA implementation process results in memory.

2. The computer system in claim 1, wherein the trace processing module is configured, in response to steps a-g being completed for a last subprocess of the EDA implementation process, to store the updated electronic ledger and data used to calculate the hash values for all the subprocesses for the EDA implementation process in a trace archive file, wherein the trace archive file includes information for detection of tampering in one or more of:

any of the subprocesses of the EDA implementation process, the implementation settings for each of the subprocesses of the EDA implementation process, and inputs and outputs for each of the subprocesses of the EDA implementation process.

3. The computer system in claim 1, wherein the implementation settings in step a include one or more of: global properties and settings associated with the EDA implementation process and local properties and settings associated with the subprocess.

4. The computer system in claim 1, wherein the trace processing module is configured to record results from steps 1-g for each subprocess in a blockchain in the updated electronic ledger.

5. The computer system in claim 1, wherein the instructions, when executed by the at least one hardware processor, cause a retrace auditor processing module to access the trace results and perform an audit of each of the subprocesses stored in the electronic ledger for the traced EDA implementation process.

6. The computer system in claim 5, wherein the retrace auditor processing module is configured, for each subprocess of the traced EDA implementation process, to separately repeat the steps a-g first performed and repeated by the trace processing module.

7. The computer system in claim 6, wherein when the signed hash from the electronic ledger is successfully authenticated and matches the reconstructed hash after separately repeating the steps a-g for each subprocess, the retrace auditor processing module is configured to generate a signal indicating that the integrity of the subprocess was not tampered with, and when the signed hash from the electronic ledger is not successfully authenticated or does not match the reconstructed hash after separately repeating the steps a-g for each subprocess, the retrace auditor processing module is configured to generate an error signal indicating that the integrity of the subprocess was tampered with.

8. The computer system in claim 7, wherein the retrace auditor processing module is configured to verify that required properties or implementation settings were applied during the original EDA implementation process.

9. The computer system in claim 1, wherein the instructions, when executed by the at least one hardware processor, cause a retrace rebuild processing module to retrieve the traced EDA implementation process results stored in memory and attempt to recreate the original EDA implementation process and verify that a final physically realized circuit is identical to that of the original EDA implementation process.

10. The computer system in claim 9, wherein the retrace rebuild processing module is configured to generate a sequence of instructions that direct the computer system to reproduce the subprocesses of the EDA implementation process necessary to realize the circuit.

11. The computer system in claim 10, wherein as each subprocess is processed, the retrace rebuild processing module is configured to apply properties and settings captured by the trace processing module to ensure identical execution of the subprocess.

12. The computer system in claim 10, wherein reproducing the subprocesses of the EDA implementation process includes processing vendor specific information regarding vendor specific execution of subprocesses and customizations and applying the vendor specific information reproduce the subprocesses of the EDA implementation process necessary to realize the circuit.

13. The computer system in claim 9, wherein the traced EDA implementation process results in memory include a traced, final physically realized circuit, and wherein the retrace rebuild processing module is configured to compare the final physically realized circuit to the traced, final physically realized circuit to determine whether a match occurs.

14. The computer system in claim 9, wherein the retrace rebuild processing module is configured to:

process data files from an independent repository or computing system that includes independent copies of desired hardware model and properties and settings for execution of the EDA implementation process to generate an independently generated, final physically realized circuit, and compare the final physically realized circuit to the independently generated, final physically realized circuit to determine whether a match occurs.

15. A method for tracing an original electronic design automation (EDA) implementation process for electronic hardware designs, where the original EDA implementation process includes multiple subprocesses to convert a hardware model to a physically-realized electronic circuit, the method comprising a processing system that includes at least one processor performing the following steps:
   inputting a cryptographic key and design information that includes the hardware model and one or more of: constraints, properties, implementation settings, and other directives for directing conversion of the hardware model into the physically-realized circuit;
   processing the cryptographic key and design information to generate a sequence of instructions that direct the trace processing module to execute the subprocesses of the EDA implementation process and provide traceability of each subprocess of the EDA implementation process;
   for each subprocess of the EDA implementation process, the processing system performing the following steps:
      a—gathering intermediate design state and implementation settings resulting from or influencing execution of the subprocess;
      b—combining the intermediate design state and implementation settings into a data string and determine a cryptographic hash value for the data string;
      c—digitally signing the cryptographic hash value using a digital signature certificate derived from a cryptographic key to generate a signed hash;
      d—storing the signed hash and identifiers associated with data files used for determining the cryptographic hash value to an electronic ledger to generate an updated electronic ledger;
      e—authenticating the signed hash from the electronic ledger to generate an authenticated signed hash;
      f—reconstructing a hash from the data files stored in the electronic ledger to generate a reconstructed hash; and
      g—comparing the authenticated signed hash with the reconstructed hash, and in response to a mismatch, generate an error signal; and
   repeating the steps a-g for each subsequent subprocess of the EDA implementation process and store traced EDA implementation process results in memory.

16. The method in claim 15, further comprising a retrace auditor processing module implemented by the computer system accessing the trace results and performing an audit of each of the subprocesses stored in the electronic ledger for the traced EDA implementation process.

17. The method in claim 16, further comprising:
   the retrace auditor processing module, for each subprocess of the traced EDA implementation process, separately repeating the steps a-g first performed and repeated by the trace processing module, and
   in response to the signed hash from the electronic ledger being successfully authenticated and matching the reconstructed hash after separately repeating the steps a-g for each subprocess, the retrace auditor processing module generating a signal indicating that the integrity of the subprocess was not tampered with, and
   in response to the signed hash from the electronic ledger not being successfully authenticated or not matching the reconstructed hash after separately repeating the steps a-g for each subprocess, the retrace auditor processing module generating an error signal indicating that the integrity of the subprocess was tampered with.

18. The method in claim 15, further comprising a retrace rebuild processing module implemented by the computer system:
   retrieving the traced EDA implementation process results stored in memory;
   attempting to recreate the original EDA implementation process; and
   verifying that a final physically-realized circuit is identical to that of the original EDA implementation process.

19. The method in claim 18, wherein the traced EDA implementation process results in memory include a traced, final physically realized circuit, and wherein the method further comprises the retrace rebuild processing module comparing the final physically-realized circuit to the traced, final physically-realized circuit to determine whether a match occurs.

20. A non-transitory, computer-readable storage medium encoded with instructions that, when executed by at least one hardware processor, cause the at least one hardware processor to perform a method for tracing an original electronic design automation (EDA) implementation process for electronic hardware designs, where the original EDA implementation process includes multiple subprocesses to convert a hardware model to a physically-realized electronic circuit, the method comprising a processing system that includes at least one processor performing the following steps:
   inputting a cryptographic key and design information that includes the hardware model and one or more of: constraints, properties, implementation settings, and other directives for directing conversion of the hardware model into the physically-realized circuit;
   processing the cryptographic key and design information to generate a sequence of instructions that direct the trace processing module to execute the subprocesses of the EDA implementation process and provide traceability of each subprocess of the EDA implementation process;
   for each subprocess of the EDA implementation process, the processing system performing the following steps:
      a—gathering intermediate design state and implementation settings resulting from or influencing execution of the subprocess;
      b—combining the intermediate design state and implementation settings into a data string and determine a cryptographic hash value for the data string;
      c—digitally signing the cryptographic hash value using a digital signature certificate derived from a cryptographic key to generate a signed hash;
      d—storing the signed hash and identifiers associated with data files used for determining the cryptographic hash value to an electronic ledger to generate an updated electronic ledger;
      e—authenticating the signed hash from the electronic ledger to generate an authenticated signed hash;
      f—reconstructing a hash from the data files stored in the electronic ledger to generate a reconstructed hash; and
      g—comparing the authenticated signed hash with the reconstructed hash, and in response to a mismatch, generate an error signal; and
   repeating the steps a-g for each subsequent subprocess of the EDA implementation process and store traced EDA implementation process results in memory.

* * * * *